(No Model.)
W. S. WASHBURN.
BIT STOCK.
No. 323,989.          Patented Aug. 11, 1885.
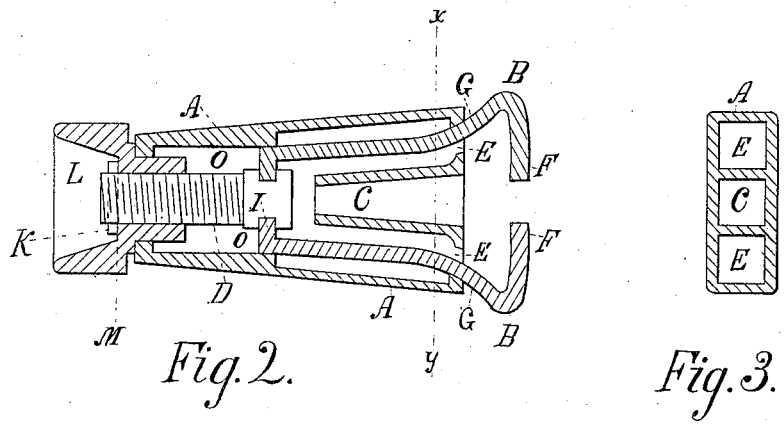
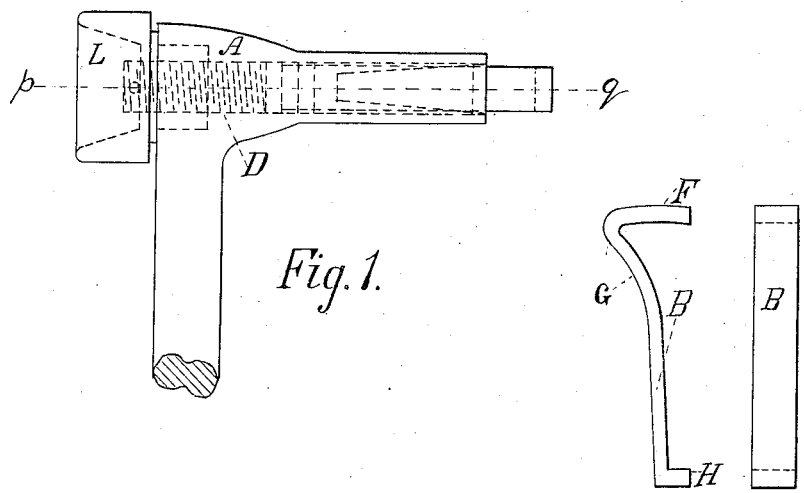
Witnesses
Robert O. Harris
B. W. Harris
Inventor
Wm. S. Washburn.

UNITED STATES PATENT OFFICE.

WILLIAM S. WASHBURN, OF EAST BRIDGEWATER, MASSACHUSETTS.

BIT-STOCK.

SPECIFICATION forming part of Letters Patent No. 323,989, dated August 11, 1885.

Application filed October 8, 1884. (No model.)

*To all whom it may concern:*

Be it known that I, WILLIAM S. WASHBURN, of East Bridgewater, in the county of Plymouth and State of Massachusetts, have invented a new and useful Improvement in Bit-Stocks; and I do hereby declare that the following is a full, clear, and exact description thereof, which will enable others skilled in the art to make and use the same, reference being had to the accompanying drawings, forming a part of this specification.

This invention relates to new and useful improvements in bit-stocks or braces for holding boring-bits and other tools, and is embodied in the construction, arrangement, and combination of parts, consisting of a hollow head, A, jaws B B, spindle D, pin K, and nut L, whereby said jaws are operated so as to fasten or release the tool, as hereinafter more fully described.

In the drawings, Figure 1 represents an outside view of the head, with the stock broken at W. Fig. 2 represents a sectional view, on the line *p q*, of the stock and accompanying mechanism. Fig. 3 represents a sectional view of the stock on the line *x y*. Fig. 4 represents the fastening-jaws detached.

Similar letters of reference indicate corresponding parts.

A represents a hollow head containing the rectangular tapering socket C, for holding the tip of the tang of the bit.

B B represent the sliding jaws, having at one end the projections F F, for gripping the bit, and also the inclined surfaces G G, while at the other end are the hooks H H, by which the jaws B B are attached to the spindle D.

D represents a spindle, the upper end having a screw-thread, and the lower end, of rectangular shape, containing the slots I I for receiving the hooks H H of the jaws B B.

L represents a thumb-nut, which turns upon the spindle D, and of such shape as to form a guard for the spindle D. Through the spindle D is the pin K.

The jaws B B are entered into the hollow head A through the apertures E E, and connected with the spindle D. Then, by tightening the nut L, the jaws B B and spindle D are drawn within the lesser space O of the head A, in which position the jaws B B cannot be disconnected from the spindle D. The pin K is then driven through the spindle D on a line with the surface M of the nut L, thus preventing the nut L being turned so as to disengage the jaws B B from the spindle D.

To attach a bit to the stock, place the tang of the bit in the socket C of the head A; then, by tightening the nut L, the inclined surfaces G G of the jaws B B are made to slide upon the sides of the head A, thus forcing the projections F F of the jaws B B downward and inward upon the stem of the bit, and holding it securely in the socket.

I do not confine myself to the shape of the hooks H and slots I, as shown in drawings, but to any convenient shape, whether it be round, square, or otherwise, by which the jaws B B and spindle D can be joined together, substantially as described.

What I claim as new, and which I desire to secure by Letters Patent, is—

In a bit-stock having a rectangular tapering socket in the head for holding the tang of the bit, the combination of the screw-spindle located in the hollow recess of the stock, at the opposite end to the tang-socket, said spindle being provided at its upper end with the limiting-pin K and the nut L and at its lower end with the slots I, with the jaws B B passing through apertures on either side of the tang-socket and engaging, by their hooks H, with the slots I of the spindle, substantially as described.

WM. S. WASHBURN.

Witnesses:
ROBERT O. HARRIS,
B. W. HARRIS.